(12) United States Patent
Jaeger

(10) Patent No.: US 8,672,110 B2
(45) Date of Patent: Mar. 18, 2014

(54) AUTOMATIC TORQUE OVERLOAD CLUTCH

(75) Inventor: Daryl J. Jaeger, Kewaskum, WI (US)

(73) Assignee: Actuant Corporation, Menomonee Falls, WI (US)

( * ) Notice: Subject to any disclaimer, the term of this patent is extended or adjusted under 35 U.S.C. 154(b) by 188 days.

(21) Appl. No.: 13/232,709

(22) Filed: Sep. 14, 2011

(65) Prior Publication Data

US 2012/0073928 A1 Mar. 29, 2012

Related U.S. Application Data

(60) Provisional application No. 61/387,748, filed on Sep. 29, 2010.

(51) Int. Cl.
*F16D 7/04* (2006.01)
*F16D 43/20* (2006.01)

(52) U.S. Cl.
USPC ............................................. 192/56.1; 464/37

(58) Field of Classification Search
USPC ................. 192/56.1, 48.6, 56.5, 56.3; 464/37
See application file for complete search history.

(56) References Cited

U.S. PATENT DOCUMENTS

| | | | |
|---|---|---|---|
| 1,126,219 A | 1/1915 | Hupp | |
| 2,493,232 A | 1/1950 | Dodge | |
| 3,228,209 A | 1/1966 | Hersey | |
| 4,041,729 A | 8/1977 | Bilz | |
| 4,261,453 A | 4/1981 | Kunze | |
| 4,373,923 A | 2/1983 | Kilwin | |
| 4,417,650 A * | 11/1983 | Geisthoff | 192/56.1 |
| 4,744,447 A | 5/1988 | Kato et al. | |
| 4,792,321 A * | 12/1988 | Lundquist | 464/35 |
| 4,848,547 A * | 7/1989 | Kampf | 192/48.6 |
| 5,308,281 A | 5/1994 | Nienhaus | |
| 5,524,870 A | 6/1996 | Tallent et al. | |
| 5,531,307 A | 7/1996 | Fechter et al. | |

(Continued)

FOREIGN PATENT DOCUMENTS

| | | |
|---|---|---|
| EP | 0870944 A1 | 10/1998 |
| EP | 1197671 A1 | 4/2002 |

(Continued)

OTHER PUBLICATIONS

Applicant's Exhibit A—"Belleville Washers", p. 34, admitted prior art.

*Primary Examiner* — Rodney Bonck
*Assistant Examiner* — Lillian Nguyen
(74) *Attorney, Agent, or Firm* — Michael Best & Friedrich, LLP

(57) ABSTRACT

A torque overload clutch comprises outer and inner members. A recess is formed in the outer member and a radial opening is formed in the inner member. A driving member is slideably captured in the opening to move between an extended, engaged position with the recess and a retracted, disengaged position. An actuator ring is urged by a spring into engagement with the driving member to bias the driving member toward the engaged position. An end of the driving member may engage the recess to define an engagement angle that is approximately between thirty-four and seventy degrees relative to a radially oriented reference. The driving member may be slideably captured in a liner seated in the opening, and one or both may be impregnated with a lubricant. A bearing may be positioned between the inner and outer members to inhibit relative movement along the clutch axis.

20 Claims, 8 Drawing Sheets

(56) References Cited

U.S. PATENT DOCUMENTS

| | | | |
|---|---|---|---|
| 5,632,568 A | 5/1997 | Fechter | |
| 5,681,222 A | 10/1997 | Hansen et al. | |
| 5,700,196 A | 12/1997 | Banemann et al. | |
| 5,718,634 A | 2/1998 | Mikeska et al. | |
| 5,733,196 A | 3/1998 | Nienhaus | |
| 5,779,385 A | 7/1998 | Fechter | |
| 5,803,811 A | 9/1998 | Fechter | |
| 5,807,179 A | 9/1998 | Hansen et al. | |
| 5,820,465 A | 10/1998 | Vogl | |
| 6,059,087 A | 5/2000 | Parry | |
| 6,224,266 B1 * | 5/2001 | Ohtsuki et al. | 384/571 |
| 6,346,049 B1 | 2/2002 | Edi | |
| 6,439,351 B1 * | 8/2002 | Sanitate et al. | 188/72.4 |
| 6,447,397 B1 | 9/2002 | Jaeger et al. | |
| 6,666,283 B2 | 12/2003 | Frauhammer et al. | |
| 6,666,614 B2 | 12/2003 | Fechter et al. | |
| 7,794,329 B2 | 9/2010 | Jaeger | |
| 2005/0103592 A1 | 5/2005 | Kampf | |
| 2007/0062775 A1 * | 3/2007 | Bird et al. | 192/46 |
| 2007/0290424 A1 * | 12/2007 | Rhodes et al. | 267/273 |
| 2008/0214313 A1 * | 9/2008 | Jaeger | 464/38 |
| 2009/0318239 A1 * | 12/2009 | Kampf | 464/37 |

FOREIGN PATENT DOCUMENTS

| | | |
|---|---|---|
| FR | 2860848 A1 | 4/2005 |
| JP | 05-280552 A | 10/1993 |
| SE | 181986 | 12/1962 |
| SU | 497429 A1 | 12/1975 |
| SU | 737682 A1 | 5/1980 |
| WO | 98/06959 | 2/1998 |

* cited by examiner

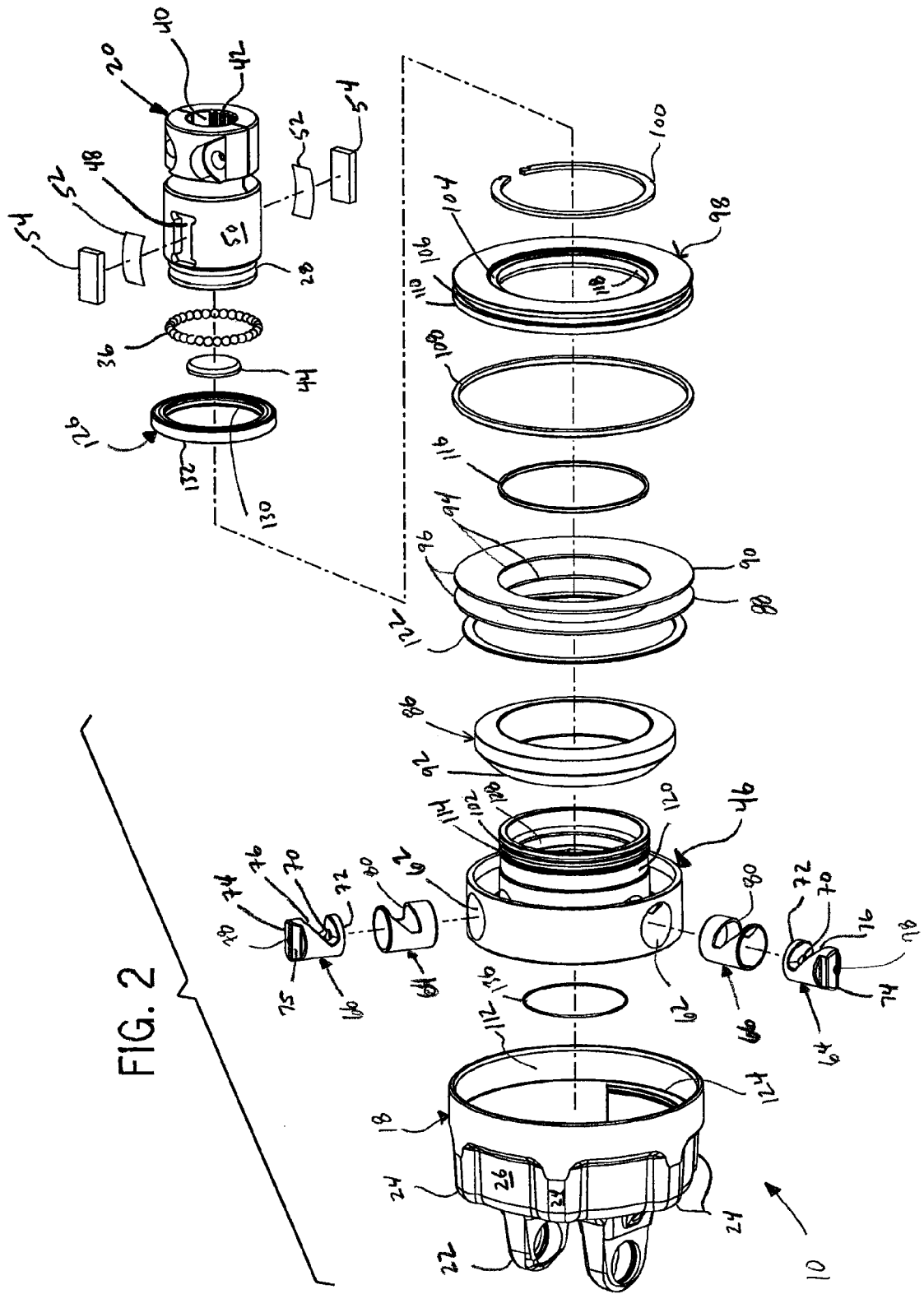

AUTOMATIC TORQUE OVERLOAD CLUTCH

CROSS REFERENCES TO RELATED APPLICATIONS

This application claims priority to U.S. Provisional Application No. 61/387,748 filed on Sep. 29, 2010, which is hereby incorporated by reference as if fully set forth herein.

STATEMENT REGARDING FEDERALLY SPONSORED RESEARCH

Not applicable.

BACKGROUND OF THE INVENTION

The present invention relates to torque overload clutches, and more particularly to automatic torque overload clutches providing consistent torque overload protection.

Torque overload clutches are used in various applications to generally limit the maximum level of torque transferred between two or more devices that are coupled to the clutch, such as a drive shaft and a driven shaft. When the amount of torque being transferred through the clutch exceeds a set level, the clutch allows for relative rotation between the devices to minimize any undesirable consequences associated with excess torque transfer. Some torque overload clutches provide for automatic re-coupling of the devices when the level of torque being applied to the clutch drops below the set maximum level.

In many mechanically actuated clutches, the maximum level of torque transmission is pre-set by selecting a biasing force that urges a moveable member into a coupling arrangement, wherein the entire clutch rotates in unison to transfer substantially all of the applied torque. Excessive torque applied to the clutch provides sufficient force to overcome the biasing force thus moving the moveable member to decouple the devices, for example, decoupling the drive shaft and the driven shaft such that they do not rotate in unison.

Consistent torque overload protection is beneficial in many applications. For instance, if the clutch decouples at a torque that is too low, the overall configuration may decouple prematurely thereby hampering effective operation of the devices. Alternatively, if the clutch decouples at a torque that is too high, the additional stresses may negatively impact the operational life of the devices. Take for example a wood chipper. A torque overload clutch may be coupled between the drive shaft of a motor and a roller feeding wood into a wood chute to be chipped. If the clutch decouples at too low of a torque value, the roller will not be able to feed wood up to the maximum capacity of the wood chipper. Conversely, if the clutch decouples at too high of a torque value, the motor (and any intermediate gearing) is subjected to excess, undesirable stress. It is desirable that the statistical range of torques at which a series of manufactured torque overload clutches disengage is within as narrow of a range as possible so that machines using them can be adjusted to operate predictably to their maximum capacity.

Many other applications benefit from consistent torque overload protection. Therefore, a need exists for an improved torque overload clutch that provides for consistent torque overload protection.

SUMMARY OF THE INVENTION

The present invention generally provides a torque overload clutch having one or more improvements that enhance consistent torque overload protection.

In one aspect, a torque overload clutch, which is capable of rotation about a clutch axis, comprises an outer member and an inner member that is positioned radially inward from the outer member. A recess is formed in the outer member, and an opening is formed through the inner member and oriented substantially radially relative to the clutch axis. A driving member is slideably captured in the opening such that the driving member moves along a driving member axis between an engaged position, at which the driving member is extended radially outward to engage the recess, and a disengaged position, at which the driving member is retracted radially inward to disengage the recess. An actuator ring is between the outer member and the inner member, and positioned adjacent the driving member. A spring is positioned adjacent the actuator ring to urge the actuator ring along the clutch axis into engagement with the driving member, thereby biasing the driving member toward the engaged position. When the driving member is in the engaged position, an end of the driving member engages the recess defining an engagement plane that is oriented at an engagement angle that is approximately between thirty-four degrees and seventy degrees relative to a reference plane that extends radially outward from the clutch axis along the driving member axis.

In another aspect, a torque overload clutch, which is capable of rotation about a clutch axis, comprises an outer member and an inner member that is positioned radially inward from the outer member. A recess is formed in the outer member, and an opening is formed through the inner member and oriented substantially radially relative to the clutch axis. A liner is seated in the opening and a driving member is slideably captured in the liner such that the driving member moves between an engaged position, at which the driving member is extended radially outward to engage the recess, and a disengaged position, at which the driving member is retracted radially inward to disengage the recess. An actuator ring is between the outer member and the inner member, and positioned adjacent the driving member. A spring is positioned adjacent the actuator ring to urge the actuator ring along the clutch axis into engagement with the driving member, thereby biasing the driving member toward the engaged position. At least one of the liner and the driving member is impregnated with a lubricant.

In yet a further aspect, a torque overload clutch, which is capable of rotation about a clutch axis, comprises an outer member, an inner member that is positioned radially inward from the outer member, and an intermediate member that is positioned between the outer member and the inner member. A recess is formed in the outer member, and a cavity is formed in the intermediate member and oriented substantially radially relative to the clutch axis. A driving member is slideably captured in the cavity such that the driving member moves between an engaged position, at which the driving member is extended radially outward from the cavity to engage the recess thereby rotatably coupling the outer member and the intermediate member, and a disengaged position, at which the driving member is retracted radially inward into the cavity to disengage the recess thereby uncoupling the outer member and the intermediate member. An actuator ring is between the outer member and the inner member, and positioned adjacent the driving member. A spring is positioned adjacent the actuator ring to urge the actuator ring along the clutch axis into engagement with the driving member, thereby biasing the driving member toward the engaged position. A bearing is positioned between the inner member and the outer member to inhibit relative movement between the inner member and the outer member along the clutch axis.

These and still other aspects will be apparent from the description that follows. In the detailed description, a preferred example embodiment will be described with reference to the accompanying drawings. This embodiment does not represent the full scope of the invention; rather the invention may be employed in other embodiments. Reference should therefore be made to the claims herein for interpreting the breadth of the invention.

BRIEF DESCRIPTION OF THE DRAWINGS

FIG. 2 is an exploded view of the example torque overload clutch of FIG. 1;

DETAILED DESCRIPTION OF THE PREFERRED EXAMPLE EMBODIMENT

An example embodiment of a torque overload clutch will be described; however, as one skilled in the art will appreciate, the concepts described are applicable to various applications and subject to numerous modifications that fall within the scope of the claims.

Figure 1:
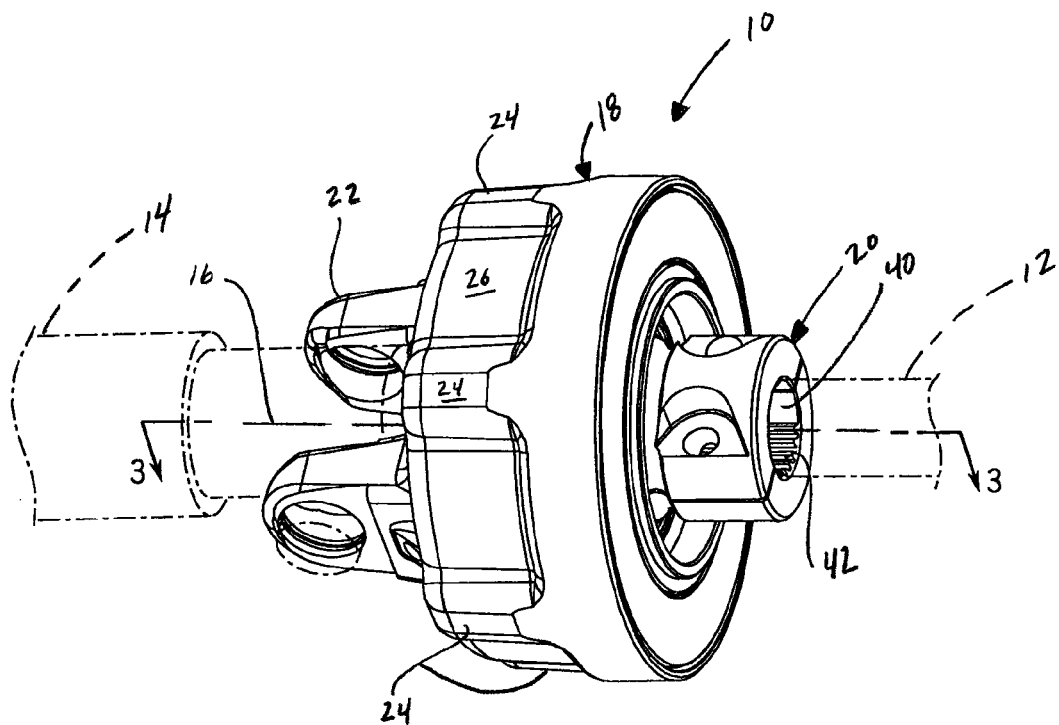
FIG. 1 is an isometric view of an example torque overload clutch.

An example torque overload clutch (10), in the form of an automatic torque overload clutch, is illustrated in FIG. 1 and referred to herein as the "clutch (10)." The clutch (10) is configured to transfer torque between devices, such as a drive member (12) and a driven member (14). As one skilled in the art will understand, the devices can be any number of machine components that benefit from consistent torque overload protection. In the example embodiment, the clutch (10) transfers torque between the drive member (12) and the driven member (14) in one direction of rotation about a clutch axis (16) up to a pre-set value. If the torque exceeds the pre-set value, the clutch (10) decouples the drive member (12) and the driven member (14), and allows the drive member (12) and the driven member (14) to rotate at different rates. Once the torque value is reduced below the pre-set value, the clutch (10) re-couples the drive member (12) and the driven member (14).

Figure 3:
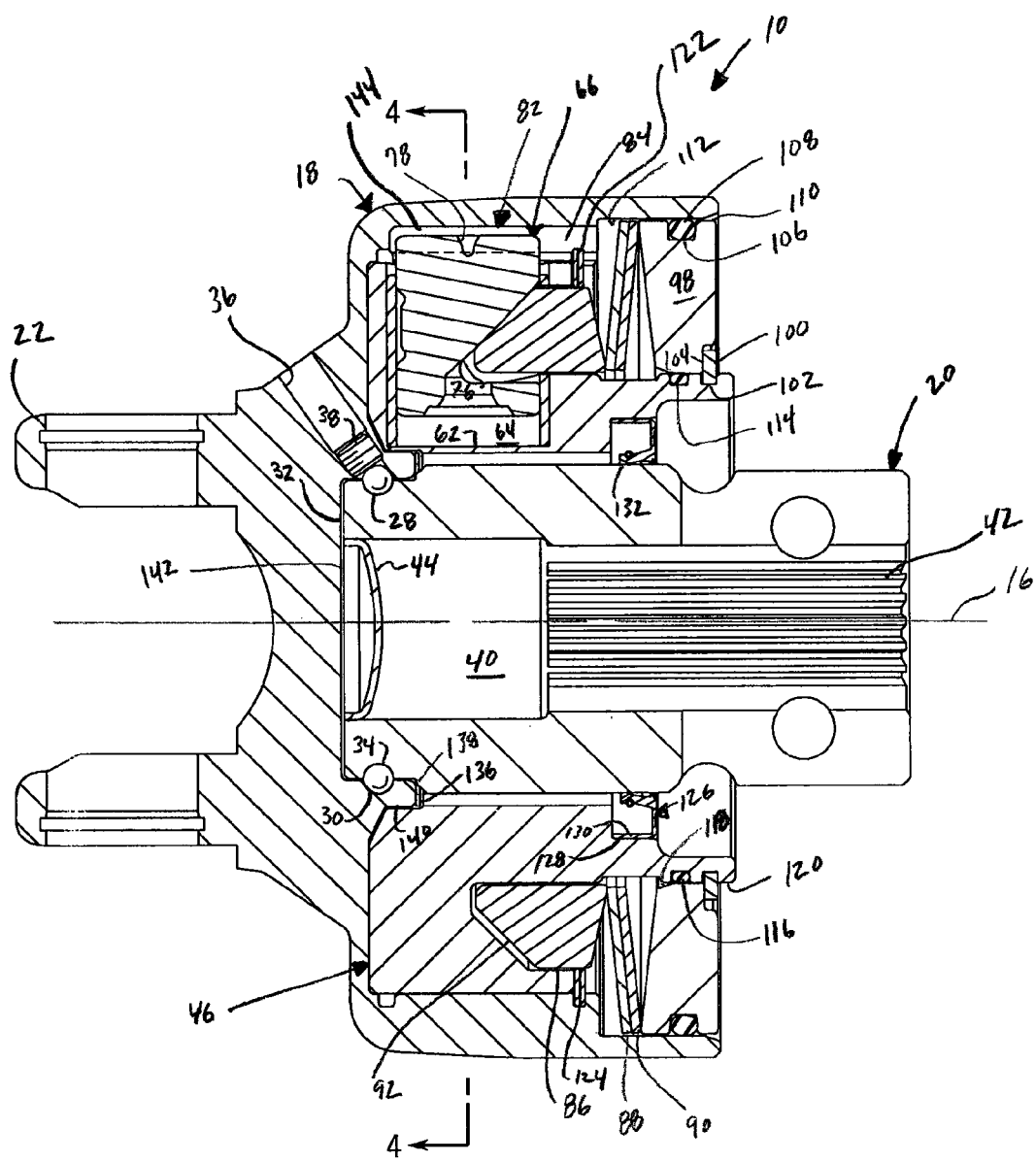
FIG. 3 is a cross-section view along line 3-3 of FIG. 1 showing example driving members in an engaged position.

With additional reference to FIGS. 2 and 3, the clutch (10) includes an outer member in the form of a housing (18) and an inner member in the form of a hub (20) that is positioned radially inward from the housing (18). The housing (18) further includes a yoke (22) integrally formed (e.g., cast) with the balance of the housing (18), which may be coupled to the driven member (14) by any conventional technique. In a preferred form, the housing (18) and yoke (22) are of one-piece construction made of a forged or cast material suitable for heat treatment, for instance UNS 8620. In some forms, the housing (18) may be hardened relative to the yoke (22) such that the yoke (22) retains ductility relative to the housing (18). As a result, the yoke (22) is less susceptible to stresses and the housing (18) exhibits improved wear resistance, while maintaining the desired fatigue life of the clutch (10). In one variation, the yoke (22) may be masked off from the housing (18) and then the exposed housing (18) may be case hardened (such as by carburizing). One skilled in the art, given the benefit of this disclosure, will appreciate the various other treatments (e.g., surface treatments, heat treatments, etc.) available to establish a relative ductility of the yoke (22).

The housing (18) further includes multiple protrusions in the form of lobes (24) circumferentially spaced about an exterior surface (26) of the housing (18). These lobes (24) are preferably evenly spaced and contoured such that the rate of rotation of the housing (18) may be monitored by a pickup device (e.g., optical, capacitive, inductive, magnetic, etc.). As a result, the housing (18) includes protrusions that aid monitoring of the state of the clutch (10). For instance, a determination of the rotational speed of the housing (18) relative to the drive member (12) and driven member (14) may be performed, which may provide beneficial diagnostic and operational data concerning the operation of the clutch (10) (e.g., "slipping" between the drive member (12) and the driven member (14)).

With continued reference to FIGS. 2 and 3, the example clutch (10) includes various additional components to enhance the consistency of the torque overload protection of the clutch (10). The hub (20) is received by the housing (18) in a bearing arrangement. Specifically, the hub (20) defines an inner race (28) that is seated adjacent an outer race (30) formed in an interior cup (32) defined by the housing (18). Multiple balls (34) are fed through a passage (36) formed through the housing (18) and into a raceway defined between the inner race (28) and the outer race (30). A set screw (38) is used to retain the balls (34) within the raceway. The bearing arrangement provides improved control of radial and axial movement during operation of the clutch (10). For instance, the typically precise tolerances of bearing arrangements minimize undesirable relative movement axially along the clutch axis (16) and radially, thus enhancing the consistency of the torque overload protection. Axial and bending forces are inhibited from being transferred along the clutch axis (16) by the bearing arrangement such that the pre-set torque value at which the clutch (10) allows for relative rotation remains relatively consistent and is generally independent of axial and bending forces applied to the clutch (10) (specifically to the driving members (66)) via the drive member (12) and/or driven member (14).

The hub (20) further includes a bore (40) extending through the hub (20) having splines (42) for engaging the drive member (12) and an end cap (44) seated within the bore (40) opposite the splines (42). The end cap (44) inhibits lubricant used in the bearing arrangement and balance of the clutch (10) from migrating into the bore (40). The end cap

(44) is configured in conjunction with various other sealing members that will be described below, and may alternatively be integral with the hub (20).

In the example clutch (10) illustrated, the hub (20) is configured such that it may rotate relative to an intermediate member (46) positioned between the housing (18) and the hub (20). Specifically, and with continued reference to FIGS. 2 and 3, pockets (48) are formed in an exterior surface (50) of the hub (20), and a resilient member, in the form of a leaf spring (52), is positioned within each pocket (48) beneath a link member in the form of a block (54). The block (54) is sized to engage the pocket (48) and the leaf spring (52) urges the block (54) radially outward toward one or more ramps (56). The ramps (56) further define one or more notches (58) against which the block (54) may abut to rotatably couple the hub (20) and the intermediate member (46).

Figure 4:
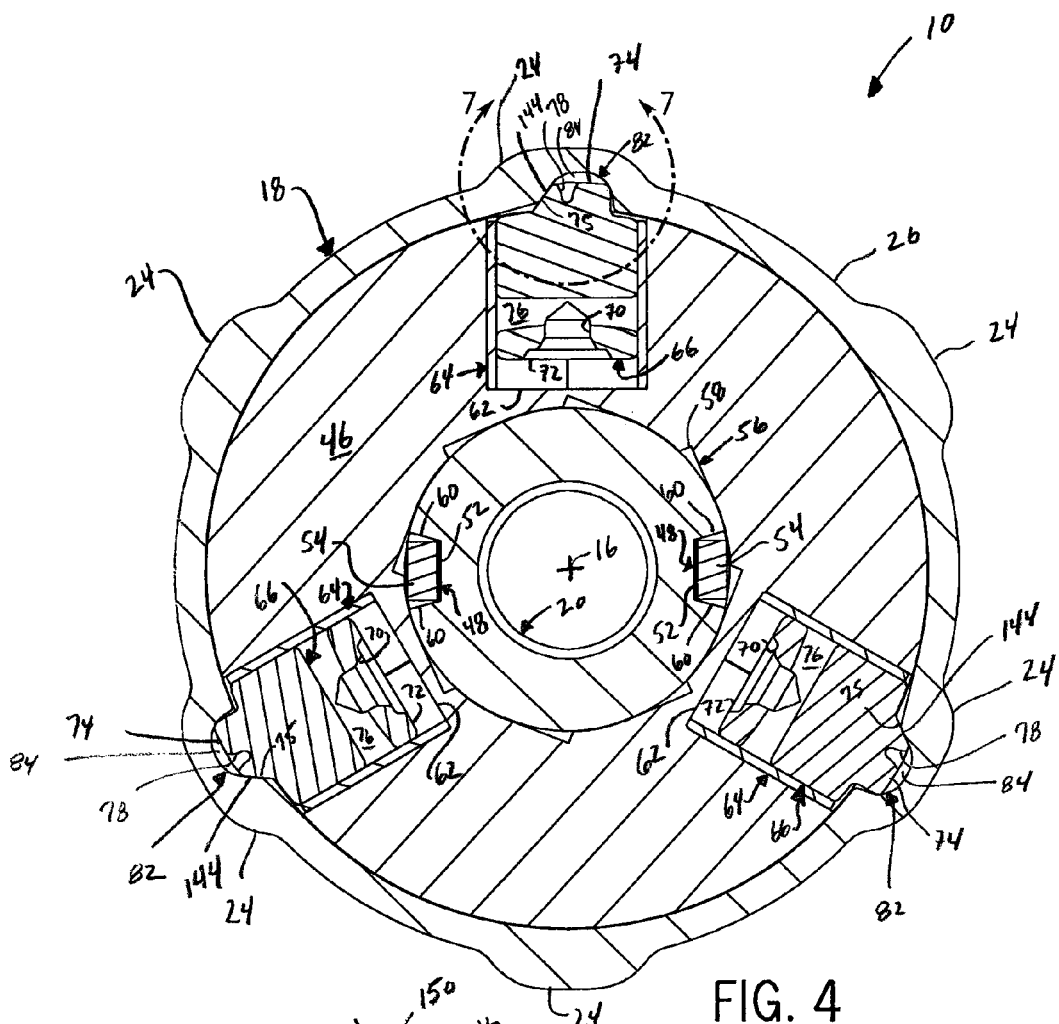
FIG. 4 is a cross-section view along line 4-4 of FIG. 3 showing the example driving members in the engaged position and example link members disengaged from an example intermediate member.

With specific reference to FIG. 4, rotating the hub (20) clockwise (as viewed relative to FIG. 4), results in the hub (20) being rotatable relative to the intermediate member (46). As the hub (20) rotates, the blocks (54) are urged radially outward by the respective leaf spring (52). Due to the orientation of the notches (58), the blocks (54) continue to slide past the notches (58) and along the ramps (56), thus being disengaged and allowing for relative rotation between the hub (20) and the intermediate member (46).

Figure 6:
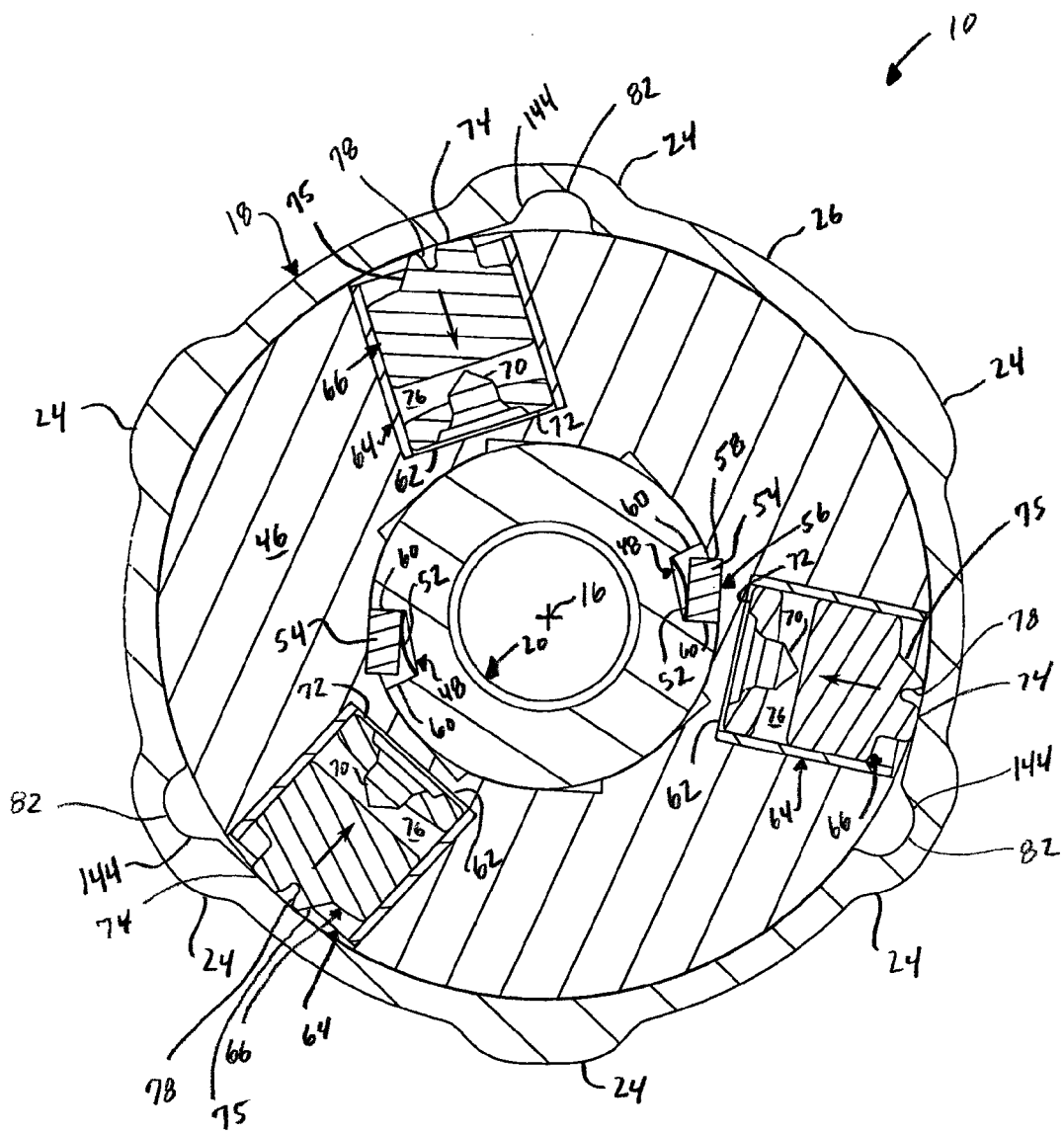
FIG. 6 is a cross-section view similar to that shown in FIG. 4 showing the example driving members in a disengaged position and the example link members engaged with the example intermediate member.

Turning to FIG. 6, rotating the hub (20) in the counterclockwise direction (as viewed relative to FIG. 6), results in the hub (20) being coupled to the intermediate member (46) as the blocks (54) abut and engage the respective notches (58) along the ramps (56). As the hub (20) rotates, the blocks (54) are urged radially outward by the respective leaf spring (52). The blocks (54) slide along the ramps (56) until the blocks (54) engage a respective notch (58). The pocket (48) includes flared sides (60) that are preferably oriented parallel to a mating notch (58), such that the block (54) seats against the notch (58) to allow coupling between the hub (20) and the intermediate member (46). The clearances and fit between the hub (20), blocks (54), intermediate member (46), pockets (48), and ramps (56) are preferably configured to be approximately at a minimum that allows for free rotation between the hub (20) and the intermediate member (46). This precision configuration aids centering and alignment of the clutch (10) to further enhance consistent torque overload protection.

Given the benefit of this disclosure, one skilled in the art will appreciate the variety of alternative configurations. For example, a "pocket" may be formed in the intermediate member (46) and a "ramp" may be formed in the hub (20), the "link member" and "notches" may have another form factor (e.g., triangular), greater or fewer "ramps" may be incorporated, the "resilient member" may be made of a polymeric material, and the like.

Returning to FIGS. 2, 3, and 4, the intermediate member (46) is annular with a generally J-shaped cross-section. An opening in the form of a cavity (62) is formed in the intermediate member (46) and is oriented substantially radially outward relative to the clutch axis (16). In the preferred embodiment, a liner (64) is seated in the cavity (62) and a driving member (66) is slideably captured in the liner (64) such that the driving member (66) may move relative to the liner (64) between an extended position (shown best in FIGS. 3 and 4) and a disengaged position (shown generally in FIGS. 5 and 6).

Figure 8:
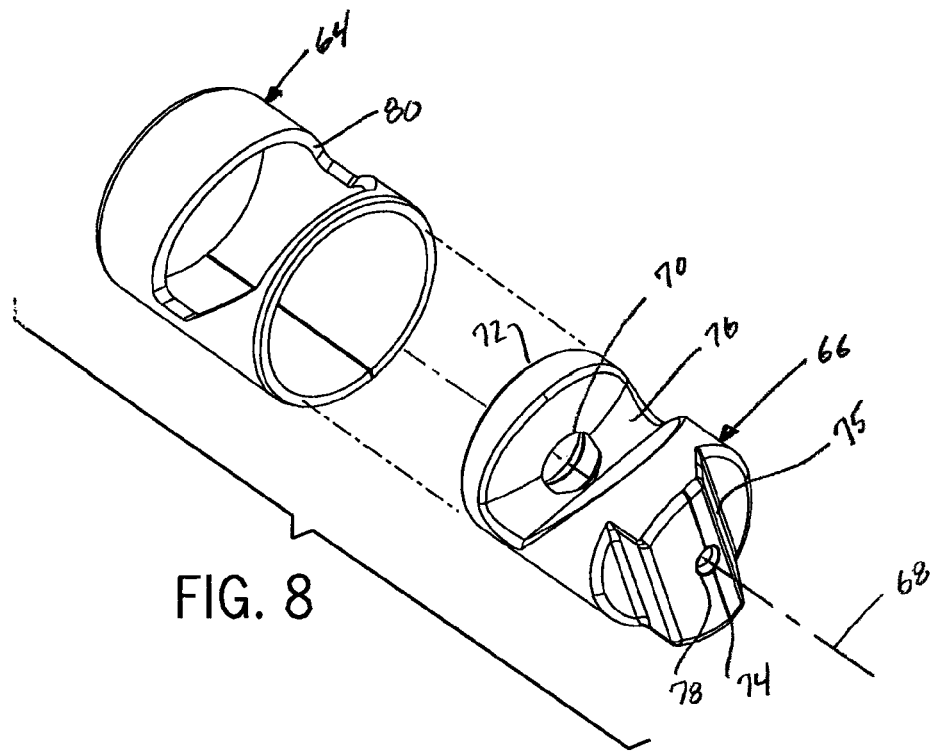
FIG. 8 is an isometric view of the example driving member spaced apart from an example liner.
Figure 7:
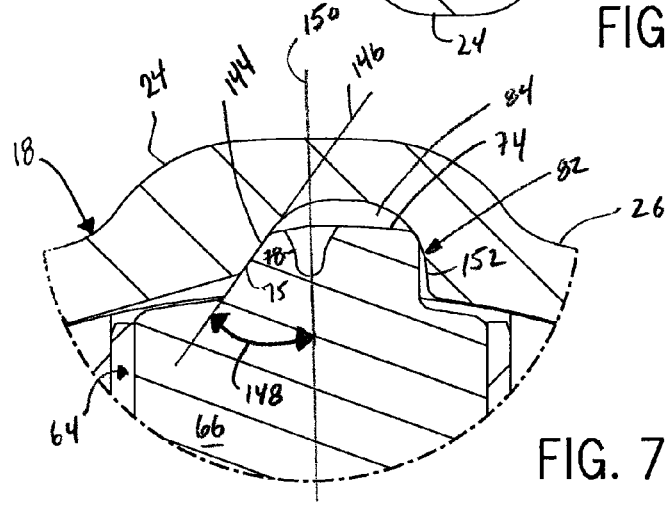
FIG. 7 is a detail view of that portion circumscribed by arc 7-7 of FIG. 4 showing an example engagement plane between the example driving member and the example recess.

The driving member (66) and liner (64) are shown in greater detail in FIG. 7. The driving member (66) of the example embodiment is generally cylindrical in overall form and defines a driving member axis (68) (shown only in FIG. 8). A port (70) extends along the driving member axis (68) from an inward end (72) toward an engagement end (74). An undercut portion (76) is formed in the driving member (66) and is defined by a generally V-shaped section removed from the generally cylindrical driving member (66). The port (70) allows lubrication to flow between the inward end (72) and the undercut portion (76) as the driving member (66) is extended and retracted during operation of the clutch (10). The driving member (66) further includes a dimple (78) formed in the engagement end (74), and is a result of manufacturing the driving member (66), such as by turning or grinding. The liner (64) is tube-shaped and includes a matching undercut portion (80), similar to the undercut portion (76) of the nested driving member (66). The driving member (66) and liner (64) are preferably sized to allow a sliding fit as the driving member (66) moves between the retracted position and the extended position.

In preferred forms, the liner (64) and driving member (66) are comprised of brass that has been impregnated and/or coated with a lubricant, such as polytetraflouroethylene. The engagement between the liner (64) and the driving member (66) reduces dynamic friction, and further provides for an engagement whereat the static coefficient of friction and the dynamic coefficient of friction are closer to equivalent than in an un-lubricated engagement. Thus, the influence of frictional engagement (both static and dynamic) between the liners (64) and the driving members (66) during operation of the clutch (10) is minimized.

With detailed reference to FIGS. 2, 3, 4, and 7, the clutch (10) is generally shown in a torque transmitting arrangement. Specifically, the driving members (66) are shown extended within the liners (64) to an engaged position at which each driving member (66) is extended radially outward to engage a recess (82) formed in the housing (18), thereby rotatably coupling the housing (18) and the hub (20). As best illustrated in FIG. 7, the recess (82) is configured to generally receive the engagement end (74) of the driving member (66), and also provides a passage (84) for lubricant.

In the example embodiment, the driving member (66) is engaged by an actuator ring (86) that is positioned adjacent the driving members (66), which is urged axially toward the driving members (66) by springs (88, 90). The actuator ring (86) includes a driving surface (92) that is contoured to slideably engage the undercut portions (76) of the driving members (66), thus urging the driving members (66) along the respective driving member axis (68) into the extended and engaged position. The springs (88, 90) are preferably discshaped and have a radially inner portion (94) engaged with the actuator ring (86) and a radially outer portion (96) bearing against a plate (98) that is axially fixed to the housing (18).

Various other components are seated generally within the housing (18) to aid operation of the clutch (10), such as a thrust bearing (136) that is positioned between a lip (138) of the hub (20) and a rim (140) of the housing (18). A split ring (122) is positioned axially adjacent to the intermediate member (46) and is seated in a groove (124) formed in the housing (18) to axially restrain the intermediate member (46) within the housing (18). Furthermore, in the example embodiment, a retainer ring (100) is seated into a groove (102) formed in the intermediate member (46) such that a lip (104) formed in the plate (98) is captured by the retainer ring (100).

With the various components arranged, the example embodiment includes multiple seals to inhibit lubricant from escaping from a cavity (142) defined between the housing (18), the plate (98), the intermediate member (46), the hub (20), and the end cap (44). Specifically, the plate (98) includes a groove (106) into which an o-ring (108) is seated to seal between an outer periphery (110) of the plate (98) and an inner surface (112) of the housing (18). The intermediate member (46) defines a groove (114) into which another o-ring (116) is seated to seal between the inner periphery (118) of the plate (98) and an outer surface (120) of the intermediate member (46). A ring seal (126) having a u-shaped cross section is seated in a ledge (128) defined by the intermediate member (46). One leg (130) of the ring seal (126) is secured in the ledge (128) and the other leg (132) bears against an outer surface (134) of the hub (20). These various seals establish the sealed cavity (142), therefore a separate lubrication passageway (e.g., Zerk fitting) is not required. The single cavity (142) provides lubrication for the operation of the driving members (66), the blocks (54), as well as the balls (34) in the raceway. Lubrication may flow between the various moving components within the clutch (10), yet debris and contaminants are inhibited from entering the cavity (142) and degrading the lubrication.

With continued reference to FIGS. 3, 4, 5, 6, and 7, the operation of the clutch (10) will be described in combination with additional details concerning the example clutch (10) components. The driving members (66) are shown extended and engaged in FIGS. 3, 4, and 7. As noted above, the driving members (66) are ultimately urged radially outward by springs (88, 90) biasing the actuator ring (86) axially along the clutch axis (16). In the example embodiment, the springs (88, 90) are Bellville springs having distinct spring rates (e.g., variable spring rates) to enable adjustability of the pre-set torque value at which the clutch (10) allows for relative rotation, that is the pre-set torque overload amount. The springs (88, 90) may be of different thicknesses, materials, inner/outer diameters, and other properties that establish distinct spring rates (variable or constant) between the springs (88, 90). As one skilled in the art will appreciate, other spring alternatives or combinations may include coned-disk, wave, slotted, finger, curve, internally slotted, and the like.

As shown in FIG. 3, the driving members (66) extend into the recesses (82) such that torque can be transferred between the drive member (12) and the driven member (14), up to the pre-set torque overload amount established by friction within the clutch (10) (e.g., friction between the driving members (66) and the recesses (82)) and the biasing force provided by the springs (88, 90). The springs (88, 90) bear against the plate (98) and urge the actuator ring (86) axially into the respective undercut portion (76) of the driving members (66). As noted above, the driving surface (92) is contoured to slideably engage the undercut portions (76) of the driving members (66), thus extending the driving members (66) along the respective driving member axis (68). The engagement end (74) of each driving member (66) is seated into the respective recess (82).

The example clutch (10) is configured to provide consistent torque overload protection when the intermediate member (46) is rotated in the counterclockwise direction (as viewed in FIGS. 4 and 6) relative to the housing (18). Rotating the hub (20) counterclockwise as shown in FIG. 4 will rotate the blocks (54) along the respective ramps (56) until the blocks (54) engage the notches (58), thus transferring torque from the hub (20) to the intermediate member (46).

The torque applied to the intermediate member (46) is then transferred to the housing (18) via the engagement between the driving members (66) that rotate with the intermediate member (46). Specifically, the engagement end (74) of each driving member (66) engages a similarly contoured surface (144) defined by each recess (82). As specifically illustrated only in FIG. 7, when the driving member (66) is extended into the engaged position, a driving surface (75) of the engagement end (74) of the driving member (66) engages the contoured surface (144) of the recess (82) along an engagement plane (146). In a preferred form, the engagement plane (146) is oriented at an engagement angle (148) that is approximately between thirty-four degrees and seventy degrees, measured relative to a reference plane (150) that extends radially outward from the clutch axis (16) along the driving member axis (68). In preferred configurations, the engagement angle (148) is approximately thirty-five degrees. This particular engagement angle (148) configuration enhances consistent torque overload protection by reducing the relative influence of friction (e.g., dynamic friction between the engagement end (74) and the recess (82)) as the resistance due to friction is relatively minimal as compared to the resistance established by the springs (88, 90). Conversely, smaller engagement angles (148) increase the relative influence of overall friction at the engagement between the driving member (66) and the recess (82) during operation. Thus, the pre-set torque overload level in the example clutch (10) remains more consistent as the frictional component between the driving members (66) and recesses (82) fluctuates under varied conditions (e.g., operating temperatures, component wear, and the like).

One or more of the recesses (82) and driving members (66) may be configured to provide a similar skewed engagement during opposite rotation of the intermediate member (46) (i.e., a second engagement plane oriented at a second engagement angle relative to and opposite from the reference plane (150)). In the example shown in detail in FIG. 7, the recess (82) includes an arcuate portion (152) opposite to the contoured surface (144) to provide a generally gradual engagement of the driving member (66) into the recess (82) as the intermediate member (46) rotates counterclockwise relative to the housing (18), and to inhibit clockwise rotation of the intermediate member (46) under most application conditions.

Figure 9:
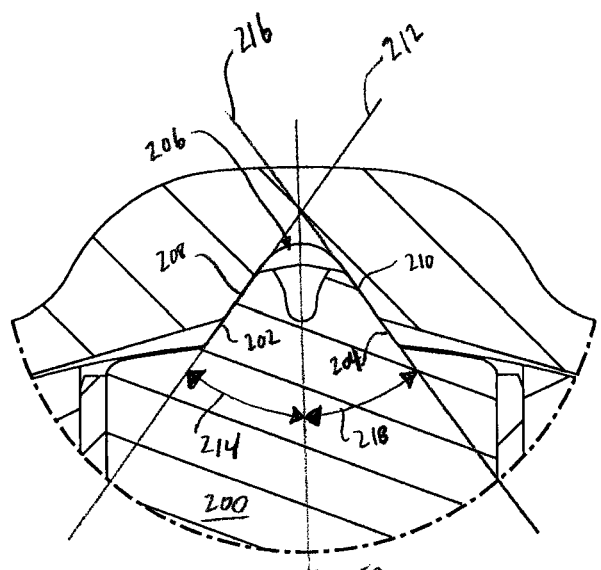
FIG. 9 is a detail view similar to FIG. 7 showing an example symmetric configuration.

In other forms, the driving members and recesses may be generally symmetric about the reference plane (150), or the engagement angle and second engagement angle may be of any relative values to provide the desired application specific engagement and torque overload protection (given consistent springs (88, 90)). For example, FIG. 9 illustrates an alternative, symmetric configuration in which a driving member (200) includes a first driving surface (202) and a second driving surface (204) that are approximately symmetric about the reference plane (150). A mating recess (206) defines a first contoured surface (208) and a second contoured surface (210). When the driving member (200) is extended into the engaged position, the first driving surface (202) of the driving member (200) engages the first contoured surface (208) of the recess (206) along a first engagement plane (212). In a preferred form, the first engagement plane (212) is oriented at a first engagement angle (214) that is approximately thirty-five degrees, measured relative to the reference plane (150). Similarly, the second driving surface (204) engages the second contoured surface (210) of the recess (206) along a second engagement plane (216). In a preferred form, the second engagement plane (216) is oriented at a second engagement angle (218) that is approximately equal to the first engagement angle (214). As a result, consistent torque overload protection is provided in both rotational directions, and the pre-set torque overload level is generally similar in either rotational direction.

Figure 10:
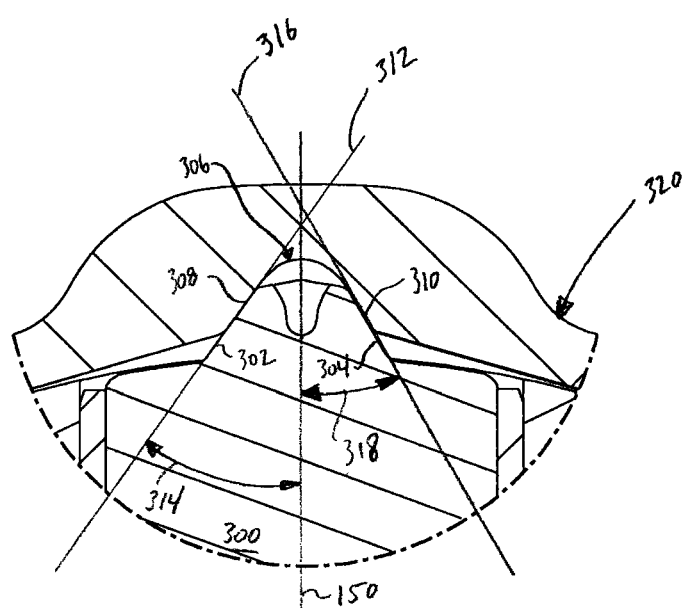
FIG. 10 is a detail view similar to FIG. 7 showing an example asymmetric configuration.

In another example shown in FIG. 10, an alternative, asymmetric configuration is illustrated in which a driving member (300) includes a first driving surface (302) and a second driving surface (304) that are asymmetric about the reference plane (150). A mating recess (306) defines a first contoured surface (308) and a second contoured surface (310). When the driving member (300) is extended into the engaged position, the first driving surface (302) of the driving member (300) engages the first contoured surface (308) of the recess (306) along a first engagement plane (312). In a preferred form, the first engagement plane (312) is oriented at a first engagement angle (314) that is approximately thirty-five degrees, measured relative to the reference plane (150). Similarly, the second driving surface (304) engages the second contoured surface (310) of the recess (306) along a second engagement plane (316). In a preferred form, the second engagement plane (316) is oriented at a second engagement angle (318) that is distinct from the first engagement angle (314), for instance, the second engagement angle (318) may be less than the first engagement angle (314) at approximately thirty degrees, measured relative to the reference plane (150). As a result, consistent torque overload protection is provided in both rotational directions. The pre-set torque overload level is generally lower when rotating the driving member (300) counterclockwise relative to a housing (320), thus engaging the first driving surface (302) and the first contoured surface (308), as compared to rotating the driving member (300) clockwise at which the second driving surface (304) engages the second contoured surface (310). In preferred forms, the first engagement angle (314) and the second engagement angle (318) are configured to be approximately thirty degrees to seventy degrees, depending upon the specific application requirements.

Figure 5:
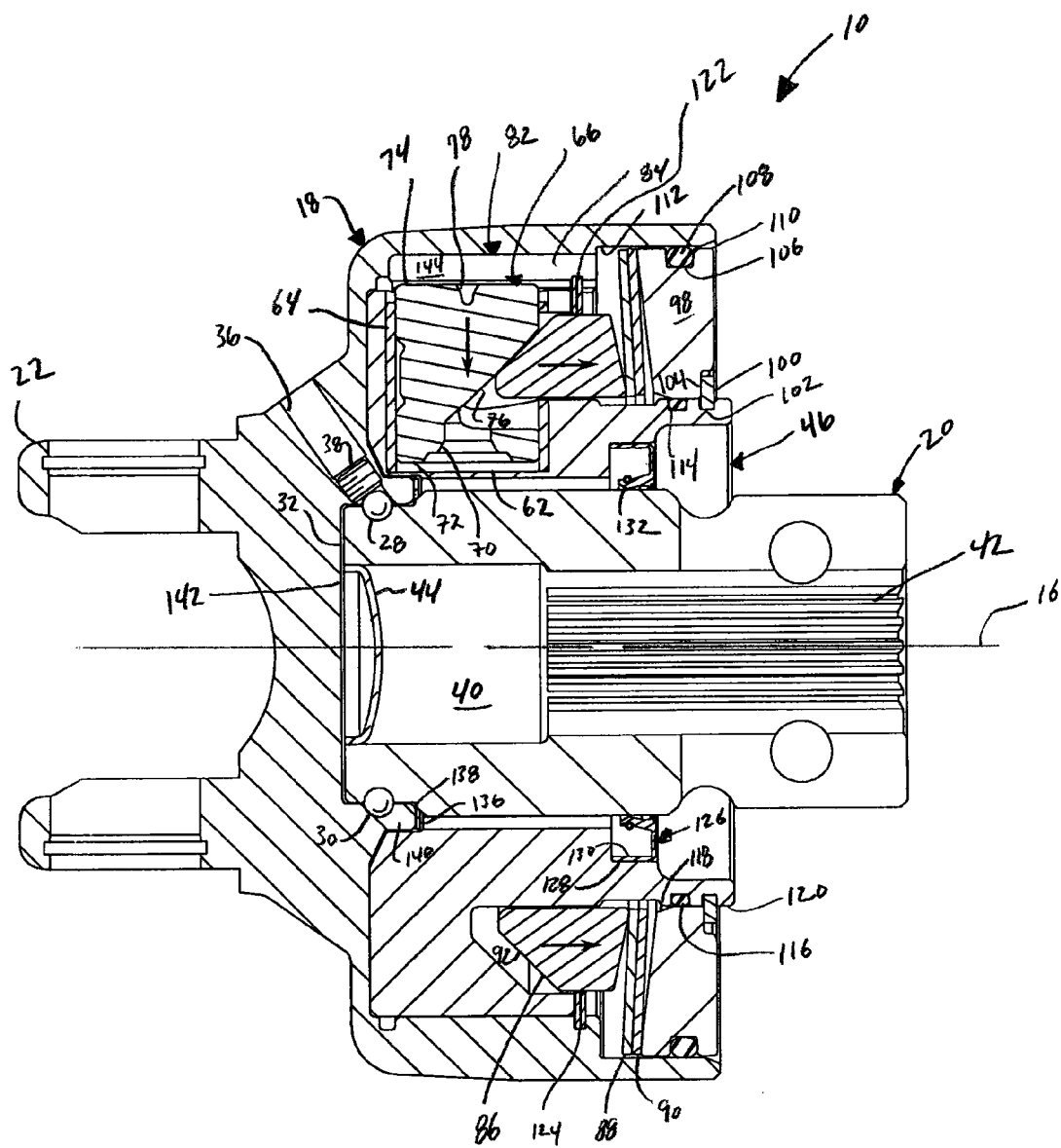
FIG. 5 is a cross-section view similar to that shown in FIG. 3 showing the example driving members progressing toward a completely disengaged position.

Returning to the embodiment shown in FIGS. 1 through 8, continuing to apply an increasing amount of relative torque between the hub (20) and the housing (18) in a manner to rotate the hub (20) counterclockwise will ultimately result in the engagement between the recesses (82) and driving members (66) urging the driving members (66) radially inward against the biasing of the springs (88, 90) to a retracted and disengaged position. As shown in FIG. 5, the pre-set torque overload protection level has been reached and the driving members (66) have begun to move radially inward. Specifically, the undercut portion (76) of the driving member (66) engages the driving surface (92) of the actuator ring (86) and moves the actuator ring (86) rightward (as viewed in FIG. 5) along the clutch axis (16). The actuator ring (86) in turn flexes the springs (88, 90) against the plate (98).

Continuing to torque the hub (20) and coupled intermediate member (46) results in the driving members (66) being slid radially inward into the fully retracted position within the cavity (62), at which the intermediate member (46) and housing (18) are rotationally disengaged. Therefore, the drive member (12) is decoupled from the driven member (14).

The springs (88, 90) continue to urge the actuator ring (86) axially to, in turn, urge the driving members (66) radially outward. Thus, each time a driving member (66) rotates through a recess (82), the driving member (66) attempts to reengage the recess (82). If the applied torque still exceeds the pre-set torque overload level, the driving member (66) will again be urged radially inward along the driving member axis (68) into the cavity (62). If the applied torque is below the pre-set torque overload level, the driving members (66) will reseat within the recesses (82), thereby re-coupling the intermediate member (46) and the housing (18).

Figure 11:
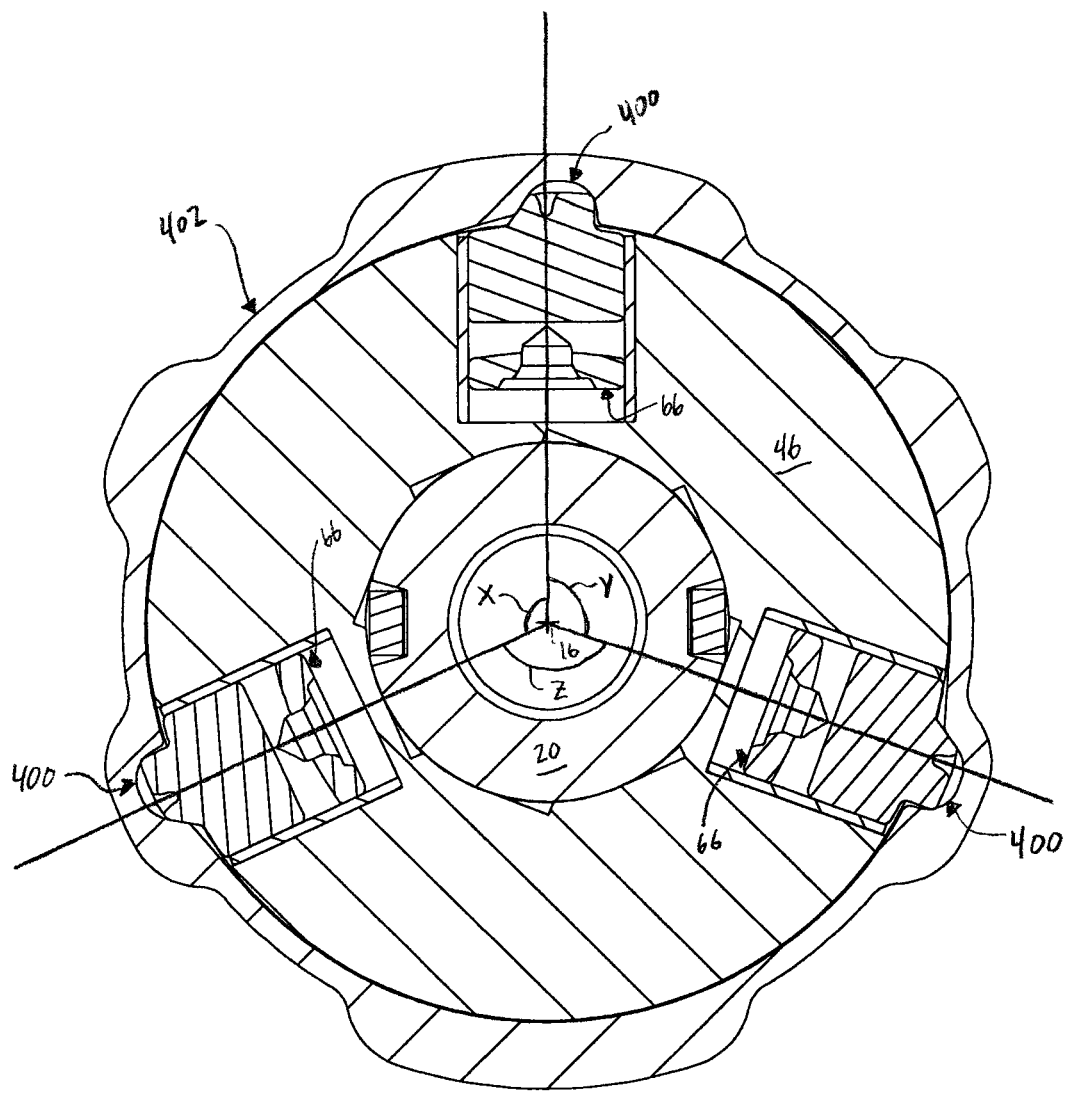
FIG. 11 is a cross-section view similar to FIG. 4 showing unequal circumferential spacing between adjacent example driving members.

While the example embodiment illustrates three pairs of driving members (66) and mating recesses (82), given the benefit of this disclosure, one skilled in the art will appreciate that various other configurations are available, including those using greater or fewer driving members (66) and recesses (82). Moreover, while the adjacent driving members (66) and recesses (82) are circumferentially spaced approximately one-hundred and twenty degrees apart (as viewed in FIGS. 4 and 6), the spacing may be such that adjacent angles are unequal. For instance, as illustrated in FIG. 11, the spacing between adjacent driving members (66) is unequal such that angles X, Y, and Z are distinct (e.g., one hundred and twenty degrees, one hundred and ten degrees, and one hundred and thirty degrees, respectively). This configuration may reduce the reengaging forces and limit wear upon the driving members (66) as the springs (88, 90) will only urge driving members (66) into respective recess (400) formed in a housing (402) once per revolution. That is, the actuator ring (86) will be biased axially rightward (as shown in FIG. 5) by two of the three driving members (66) at all rotational positions, but for one predetermined orientation at which all three drive members (66) will seat into the respective mating recess (400) (as shown in FIG. 11).

One skilled in the art will also appreciate that the example clutch (10) allows for overrunning of the intermediate member (46) and, if coupled, the housing (18). For instance, if rotation of the hub (20) is stopped (e.g., a motor rotating the drive member (12) is shut down), the intermediate member (46) and coupled housing (18) may continue to rotate counterclockwise due to inertia of the intermediate member (46), the housing (18), and coupled device(s). In this situation, the blocks (54) will slide along the ramps (56) and will not seat into the notches (58), therefore the relative rotation will occur, minimizing undesirable stresses within the clutch (10) and on any coupled devices.

While there has been shown and described what is at present considered the preferred embodiments of the invention, it will be appreciated by those skilled in the art that, given the benefit of this disclosure, various changes and modifications can be made without departing from the scope of the invention defined by the following claims. For instance, the intermediate member (46) may be integral with the hub (20) such that the cavity (62) is in the form of an opening in which the driving member (66) slides to rotatably couple the housing (18). Still other variations to the disclosed concepts are contemplated by the following claims.

I claim:

1. A torque overload clutch capable of rotation about a clutch axis, comprising:
    an outer member;
    an inner member positioned radially inward from the outer member;
    a recess formed in the outer member;
    an opening formed through the inner member and oriented substantially radially relative to the clutch axis;
    a driving member slideably captured in the opening such that the driving member moves along a driving member axis between an engaged position at which the driving member is extended radially outward to engage the recess and a disengaged position at which the driving member is retracted radially inward to disengage the recess;
    an actuator ring between the outer member and the inner member, and positioned adjacent the driving member; and
    a spring positioned adjacent the actuator ring and urging the actuator ring along the clutch axis into engagement with the driving member, thereby biasing the driving member toward the engaged position;
    wherein when the driving member is in the engaged position, an end of the driving member engages the recess defining an engagement plane oriented at an engagement angle that is approximately between thirty-four degrees and seventy degrees relative to a reference plane extending radially outward from the clutch axis along the driving member axis; and wherein the driving member includes a port extending along the driving member axis from an inward end opposite the end to an undercut portion.

2. The torque overload clutch of claim 1, wherein the engagement angle is approximately thirty-five degrees.

3. The torque overload clutch of claim 1, wherein:
the spring comprises a first spring washer and a second spring washer;
the first spring defines a first spring rate and the second spring defines a second spring rate different from the first spring rate.

4. The torque overload clutch of claim 1, wherein:
when the driving member is in the engaged position, the end of the driving member that engages the recess defines a second engagement plane; and
the second engagement plane is oriented at a second engagement angle relative to the reference plane and opposite to the engagement plane.

5. The torque overload clutch of claim 4, wherein the second engagement angle is greater than the engagement angle.

6. The torque overload clutch of claim 1, wherein:
the recess includes a first recess, a second recess, and a third recess;
the opening includes a first opening, a second opening, and a third opening;
the driving member includes a first driving member, a second driving member, and a third driving member;
the driving member axis includes a first driving member axis, a second driving member axis, and a third driving member axis;
a first angle defined about the clutch axis between the first driving member axis and the second driving member axis;
a second angle defined about the clutch axis between the second driving member axis and the third driving member axis;
a third angle defined about the clutch axis between the third driving member axis and the first driving member axis; and
the first angle, the second angle, and the third angle are not substantially equal.

7. The torque overload clutch of claim 1, further comprising a plurality of protrusions circumferentially spaced about an exterior surface of the outer member.

8. The torque overload clutch of claim 1, wherein the driving member is generally cylindrical.

9. A torque overload clutch capable of rotation about a clutch axis, comprising:
an outer member;
an inner member positioned radially inward from the outer member;
a recess formed in the outer member;
an opening formed through the inner member and oriented substantially radially relative to the clutch axis;
a liner seated in the opening;
a driving member slideably captured in the liner such that the driving member moves between an engaged position at which the driving member is extended radially outward to engage the recess and a disengaged position at which the driving member is retracted radially inward to disengage the recess;
an actuator ring between the outer member and the inner member, and positioned adjacent the driving member; and
a spring positioned adjacent the actuator ring and urging the actuator ring along the clutch axis into engagement with the driving member, thereby biasing the driving member toward the engaged position;
wherein at least one of the liner and the driving member is impregnated with a lubricant.

10. The torque overload clutch of claim 9, wherein the at least one of the liner and the driving member are coated with the lubricant.

11. The torque overload clutch of claim 9, wherein the lubricant includes polytetraflouroethylene.

12. The torque overload clutch of claim 9, wherein at least one of the driving member and the liner are comprised of brass.

13. A torque overload clutch capable of rotation about a clutch axis, comprising:
an outer member;
an inner member positioned radially inward from the outer member;
an intermediate member positioned between the outer member and the inner member;
a recess formed in the outer member;
a cavity formed in the intermediate member and oriented substantially radially relative to the clutch axis;
a driving member slideably captured in the cavity such that the driving member moves between an engaged position at which the driving member is extended radially outward from the cavity to engage the recess thereby rotatably coupling the outer member and the intermediate member and a disengaged position at which the driving member is retracted radially inward into the cavity to disengage the recess thereby uncoupling the outer member and the intermediate member;
an actuator ring between the outer member and the inner member, and positioned adjacent the driving member;
a spring positioned adjacent the actuator ring and urging the actuator ring along the clutch axis into engagement with the driving member, thereby biasing the driving member toward the engaged position; and
a bearing positioned between the inner member and the outer member to inhibit relative movement between the inner member and the outer member along the clutch axis.

14. The torque overload clutch of claim 13, further comprising:
a pocket formed in one of the intermediate member and the inner member;
a ramp formed in the one of the intermediate member and the inner member in which the pocket is not formed;
a link member seated in the pocket; and
a resilient member positioned between the pocket and the link member, and urging the link member toward the ramp;
wherein rotating the inner member relative to the intermediate member in a first direction engages the link member with a notch formed along the ramp to couple the inner member and the intermediate member, and rotating the inner member relative to the intermediate member in a second direction opposite the first direction disengages the link member with the notch to uncouple the inner member and the intermediate member.

15. The torque overload clutch of claim 13, wherein the outer member further comprises:
a housing; and
a yoke integrally formed with the housing;
wherein the housing is case hardened relative to the yoke.

16. The torque overload clutch of claim 15, wherein the housing is carburized.

17. The torque overload clutch of claim 13, further comprising:
- a plate adjacent the spring and positioned between the intermediate member and the outer member;
- a first annular seal seated between the inner member and the intermediate member;
- a second annular seal seated between the intermediate member and the plate;
- a third annular seal seated between the plate and the outer member;
- a bore formed through the inner member; and
- an end cap seated within the bore;
- wherein a lubricant is within a cavity formed by the outer member, the plate, the intermediate member, the inner member, and the end cap.

18. A torque overload clutch capable of rotation about a clutch axis, comprising:
- an outer member;
- an inner member positioned radially inward from the outer member;
- a recess formed in the outer member;
- an opening formed through the inner member and oriented substantially radially relative to the clutch axis;
- a driving member slideably captured in the opening such that the driving member moves along a driving member axis between an engaged position at which the driving member is extended radially outward to engage the recess and a disengaged position at which the driving member is retracted radially inward to disengage the recess;
- an actuator ring between the outer member and the inner member, and positioned adjacent the driving member; and
- a spring positioned adjacent the actuator ring and urging the actuator ring along the clutch axis into engagement with the driving member, thereby biasing the driving member toward the engaged position;
- wherein when the driving member is in the engaged position, an end of the driving member engages the recess defining an engagement plane oriented at an engagement angle that is approximately between thirty-four degrees and seventy degrees relative to a reference plane extending radially outward from the clutch axis along the driving member axis;
- wherein the recess includes a first recess, a second recess, and a third recess;
- wherein the opening includes a first opening, a second opening, and a third opening;
- wherein the driving member includes a first driving member, a second driving member, and a third driving member; and
- wherein the driving member axis includes a first driving member axis, a second driving member axis, and a third driving member axis;
- a first angle defined about the clutch axis between the first driving member axis and the second driving member axis;
- a second angle defined about the clutch axis between the second driving member axis and the third driving member axis;
- a third angle defined about the clutch axis between the third driving member axis and the first driving member axis; and
- wherein the first angle, the second angle, and the third angle are not substantially equal.

19. The torque overload clutch of claim 18, wherein:
- the spring comprises a first spring washer and a second spring washer;
- the first spring defines a first spring rate and the second spring defines a second spring rate different from the first spring rate.

20. The torque overload clutch of claim 18, wherein:
- when the driving member is in the engaged position, the end of the driving member that engages the recess defines a second engagement plane; and
- the second engagement plane is oriented at a second engagement angle relative to the reference plane and opposite to the engagement plane.

* * * * *